United States Patent
Liang

(10) Patent No.: US 8,209,475 B2
(45) Date of Patent: Jun. 26, 2012

(54) WRITE TIMEOUT CONTROL METHODS FOR FLASH MEMORY AND MEMORY DEVICES USING THE SAME

(75) Inventor: Chia-Chi Liang, Taichung (TW)

(73) Assignee: Silicon Motion, Inc., Jhubei, Hsinchu County, (TW)

( * ) Notice: Subject to any disclaimer, the term of this patent is extended or adjusted under 35 U.S.C. 154(b) by 230 days.

(21) Appl. No.: 12/792,864

(22) Filed: Jun. 3, 2010

(65) Prior Publication Data

US 2011/0161566 A1  Jun. 30, 2011

(30) Foreign Application Priority Data

Dec. 30, 2009 (TW) .................................. 98145739 A

(51) Int. Cl.
*G06F 12/00* (2006.01)
(52) U.S. Cl. ........................................................... 711/103
(58) Field of Classification Search .................. None
See application file for complete search history.

(56) References Cited

U.S. PATENT DOCUMENTS

| | | | | |
|---|---|---|---|---|
| 6,421,279 | B1* | 7/2002 | Tobita et al. | ........... 365/189.011 |
| 2011/0004723 | A1* | 1/2011 | Kheng-Chong | ............... 711/103 |

* cited by examiner

*Primary Examiner* — Hiep Nguyen
(74) *Attorney, Agent, or Firm* — Thomas|Kayden

(57) ABSTRACT

A write timeout control method for a flash memory having a plurality of spare blocks and data blocks including a plurality of mother blocks is disclosed. The method includes the steps of: receiving a write command and a starting logical block address; determining an update mode according to a target mother block linked to the starting logical block address; determining whether a pre-clean operation is performed on a first mother block; if so, performing a post-clean operation on the first mother block during a first time period; re-configuring the first mother block as a spare block; performing a programming process to write data on the target mother block; determining whether the number of mother blocks exceeds a first threshold; and if so, performing the pre-clean operation on a second mother block. The first and second mother blocks are configured as blocks to be cleaned.

20 Claims, 7 Drawing Sheets

FIG. 6

WRITE TIMEOUT CONTROL METHODS FOR FLASH MEMORY AND MEMORY DEVICES USING THE SAME

CROSS REFERENCE TO RELATED APPLICATIONS

This Application claims priority of Taiwan Patent Application No. 098145739, filed on Dec. 30, 2009, the entirety of which is incorporated by reference herein.

BACKGROUND OF THE INVENTION

1. Field of the Invention

The disclosure relates generally to flash memories, and, more particularly to a write timeout control method for flash memories.

2. Description of the Related Art

Flash memories are non-volatile memories which can retain stored information without power supply and has the benefits of having a small size, high memory density, low power consumption and low costs. Thus, they are commonly used in a variety of consumer electronic products such as mobile phones, digital cameras, personal digital assistants (PDAs) and so on.

Generally, a flash memory has a large number of blocks and each block includes a plurality of pages for data storage. Further, a flash memory is programmed by a unit of one page and erased by a unit of one block. That is, when an erase operation was performed on one block of the flash memory, data stored in all pages of the block would be erased at the same time.

In addition, each page of a flash memory is only allowed to be programmed once.

When data stored in several pages of a block requires to be updated, the several pages where the data is originally stored are not allowed to be directly programmed by updated data. In this case, it is necessary to erase the block before updating data stored in the several pages, so as to perform write-in or programming of the update data. The additional operations required due to the erasing and re-programming may undesirably result in execution time delays and further require extra workloads; thus degrading overall access performance.

Moreover, for flash memories to be developed with increased memory capacitance, the number of pages of each block are being increased, such as from 128 pages to 256 pages, or memory capacitance of each page are being increased, such as from 4K bytes to 8K bytes. Accordingly, execution time delays for updating data is increased due to increased erasing and re-programming operations, such that a program busy time which may be defined in a flash memory specification, such as 250 milliseconds (ms), may be exceeded. In general, it may take 200 ms to erase a block with 128 pages. As a result, it may require 400 ms to erase a block with 256 pages and re-program the block for updating data, which would cause write timeout and substantially deteriorate overall access performance.

Therefore, it is desirable to provide a write timeout control method for a flash memory capable of preventing write timeout during data programming or data updating; thereby improving overall access performance of the flash memory.

BRIEF SUMMARY OF THE INVENTION

An embodiment of a write timeout control method for a flash memory is provided. The flash memory includes a plurality of data blocks and a plurality of spare blocks. Further, the data blocks include a plurality of mother blocks. The method includes the steps of: receiving a write command and a corresponding starting logical block address from a host; determining an update mode according to a target mother block which is linked to the starting logical block address; determining whether a pre-clean operation is performed on a first mother block, wherein the first mother block is configured as a block to be cleaned; performing a post-clean operation on the first mother block during a first time period when the pre-clean operation is performed on the first mother block; re-configuring the first mother block as a spare block; performing a programming process to write data on the target mother block which is linked to the starting logical block address according to the update mode, wherein the process corresponds to the write command; determining whether the number of the mother blocks exceeds a first threshold; and performing the pre-clean operation on a second mother block during a second time period when the number of the mother blocks exceeds the first threshold, wherein the second mother block is configured as the block to be cleaned.

In addition, an embodiment of a memory device coupled to a host is provided. The memory device includes a flash memory and a controller. The flash memory includes a plurality of data blocks and a plurality of spare blocks, wherein the data blocks include a plurality of mother blocks. The controller is coupled to the flash memory for receiving a write command and a corresponding starting logical block address from the host, determining an update mode according to a target mother block which is linked to the starting logical block address, determining whether a pre-clean operation is performed on a first mother block which is configured as a block to be cleaned, performing a post-clean operation on the first mother block during a first time period when the pre-clean operation is performed on the first mother block, re-configuring the first mother block as a spare block, performing a programming process to write data corresponding to the write command on the target mother block which is linked to the starting logical block address according to the update mode, determining whether the number of the mother blocks exceeds a first threshold and performing the pre-clean operation on a second mother block which is configured as the block to be cleaned during a second time period when the number of the mother blocks exceeds the first threshold.

A detailed description is given in the following embodiments with reference to the accompanying drawings.

BRIEF DESCRIPTION OF THE DRAWINGS

The invention will become more fully understood by referring to the following detailed description with reference to the accompanying drawings, wherein:

FIG. 6 is a block diagram illustrating a mother block and an update block in a mother-FAT mode according to another embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
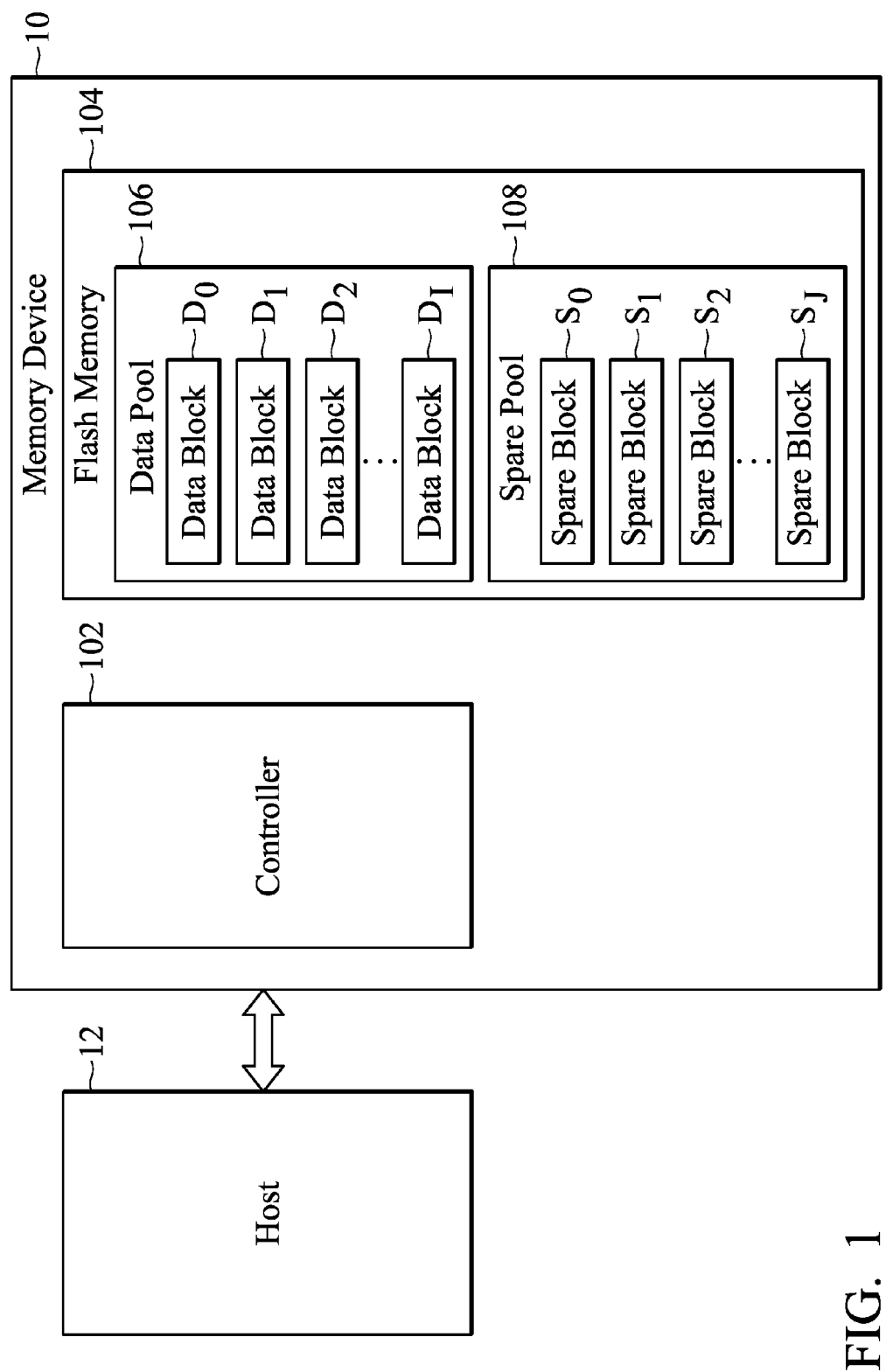
FIG. 1 is a block diagram illustrating a memory device according to an embodiment of the invention.

FIG. 1 is a block diagram illustrating a memory device 10 according to an embodiment of the invention.

As shown in FIG. 1, the memory device 10 which is coupled to a host 12 includes a controller 102 and a flash memory 104. In an embodiment, the flash memory 104 is a NAND-type flash memory and the memory device 10 includes various memory cards associated with flash memories, such as a secure digital (SD) card. In FIG. 1, the flash memory 104 includes multiple blocks and each block includes multiple pages.

Additionally, the flash memory 104 may be divided into a data pool 106 and a spare pool 108 and each of them may have a plurality of data blocks and a plurality of spare blocks, respectively. For example, in the data pool 106, blocks $D_0 \sim D_I$ are data blocks with data stored therein, and in the spare pool 108, blocks $S_0 \sim S_J$ are spare blocks without stored data or wherein data stored therein has been erased. Note that I and J may be the same number or different numbers.

As described above, data is only allowed to be written into pages without stored data (i.e., un-programmed or erased). The controller 102 may perform data programming on several pages of a data block with no data stored therein, such as block $D_0$.

However, when the host 12 attempts to update pages of the data block having data stored therein, the controller 102 is unable to perform data programming on the pages. In this situation, according to an embodiment of the invention, the controller 102 may use the spare blocks $S_0 \sim S_J$ of the spare pool 108 for data updating.

Figure 2:
FIG. 2 is a block diagram illustrating a mother block and an update block according to an embodiment of the invention.

FIG. 2 is a block diagram illustrating a target mother block 202 and an update block 204.

Refer to FIGS. 1 and 2. Specifically, the host 12 makes a request to the controller 102 to update multiple pages of a data block, such as block $D_0$, with a write data #DATA. Because the multiple pages to be updated already have data stored therein, the controller 102 is unable to directly program the write data #DATA to the multiple pages. In this case, the controller 102 may configure the data block as a target mother block 202. Next, a spare block, such as block $S_0$, is selected from the spare pool 108 and used as an update block 204 for updating the target mother block 202. Subsequently, the write data #DATA is programmed into update pages of the update block 204.

According to the aforementioned embodiments, the update block 204 has multiple update pages for updating the corresponding target mother blocks 202. Thus, the target mother blocks 202 and the update block 204 are referred to as a block pair.

In addition, without affecting the normal operation of the memory device 10, the controller 102 may allocate a predetermined number of block pairs based on the access performance requirements; thereby utilizing multiple target mother blocks and corresponding update blocks for data updating operations. According to an embodiment, when a predetermined condition is met, e.g., when the update block 204 which stores data for updating the target mother blocks 202 is full, or when the number of block pairs of the memory device 10 has been exhausted, the controller 102 would be required to further integrate the target mother block 202 and the update block 204.

According to an embodiment, the controller 102 configures the target mother block 202 as a block to be cleaned for integrating data stored in the target mother block 202 to the update block 204. Next, the target mother block 202 is erased and the erased target mother block 202 is re-configured as a spare block for future use.

According to another embodiment, the controller 102 configures the target mother block 202 as a block to be cleaned. Then, the controller 102 selects a spare block from the spare pool 108, such as block $S_1$ and then integrates the target mother block 202 and the update block 204 into the block $S_1$. Next, the target mother block 202 and the update block 204 are erased and then the erased target mother block 202 and update block 204 are re-configured as spare blocks for future use. More specifically, the aforementioned integration process for the target mother block 202 and the update block 204 may be divided into at least two steps to prevent write timeout due to memory capacitance of the block. A detailed description of data updating and integrating process is illustrated herein below with reference to FIGS. 3 to 6.

Figure 3A:
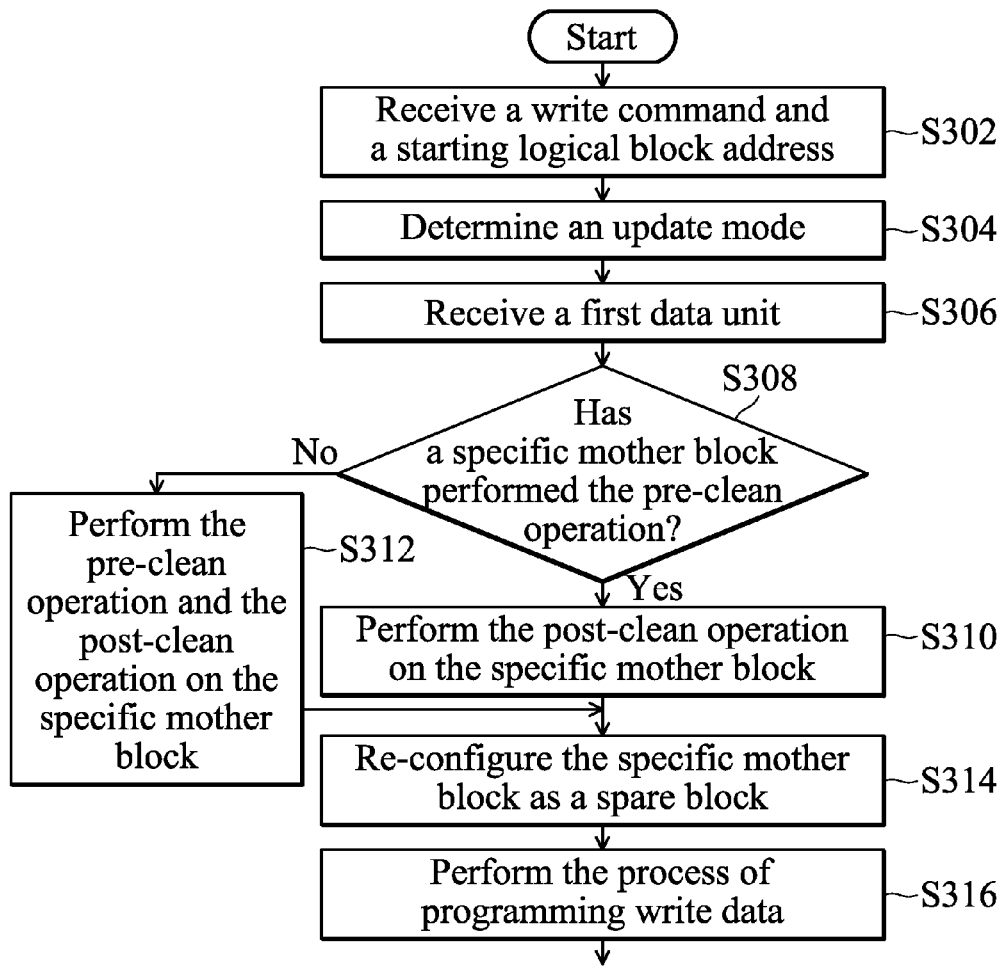
FIG. 3 is a flowchart illustrating a write timeout control method for a flash memory according to an embodiment of the invention.
Figure 3B:
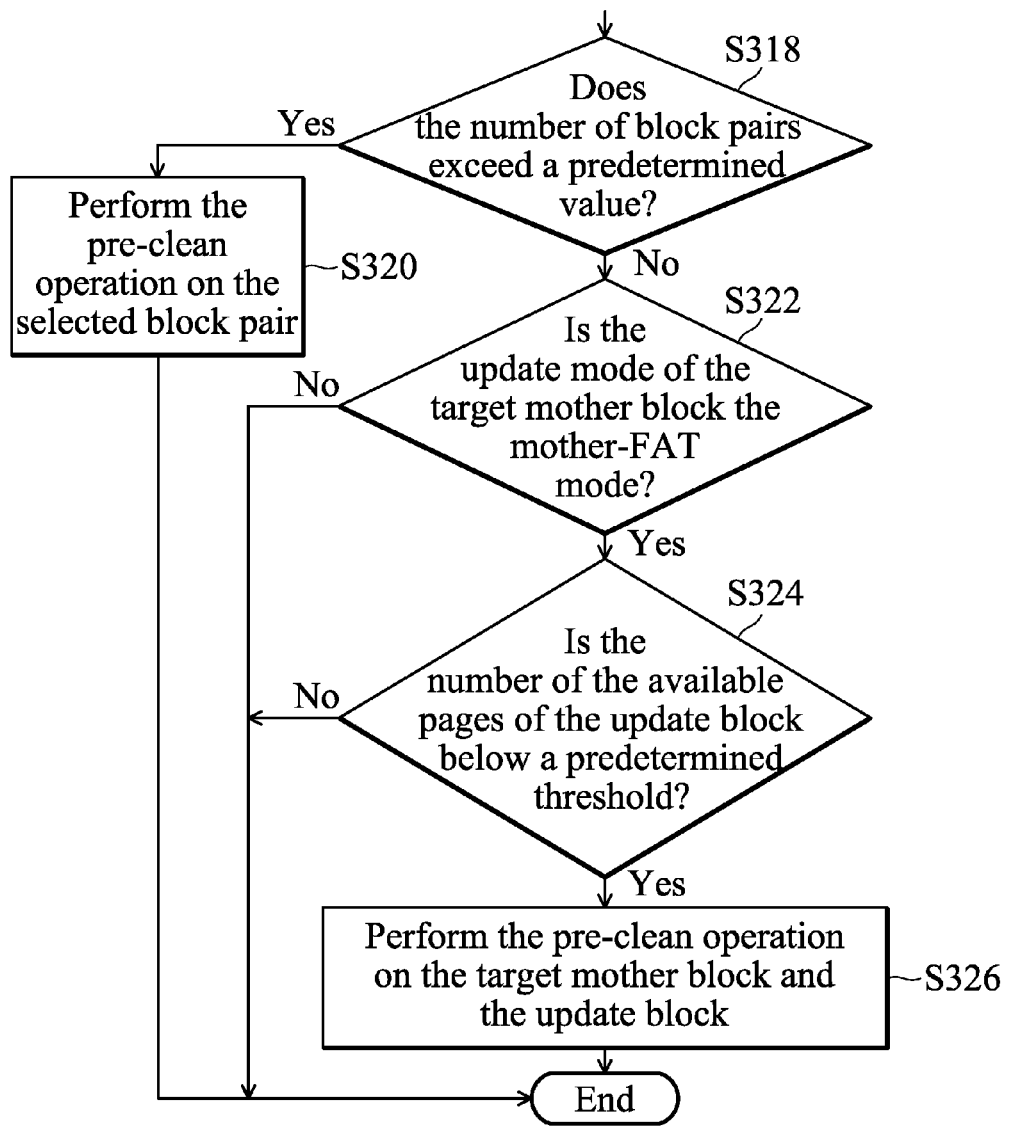

FIG. 3 is a flowchart illustrating a write timeout control method 30 for a flash memory according to an embodiment of the invention.

Referring to FIGS. 1 to 3, it is assumed that the host 12 makes a request to the controller 102 to update a data block, such as block $D_0$. The controller 102 receives a write command and a corresponding starting logical block address (LBA) from the host 12 (step S302). Next, the controller 102 links the starting logical block address to the data block to be updated, i.e. block $D_0$. Accordingly, the controller 102 configures block $D_0$ as the target mother block 202 to be updated and selects a spare block (such as block $S_0$) from the spare pool 108. The spare block is provided as an update block 204 which corresponds to the target mother block 202.

Afterwards, the controller 102 obtains write data #DATA from the host 12 for updating the pages of the target mother block 202 which is to be updated. Specifically, each page may be further divided into 4 sectors. In this manner, the write data #DATA may be divided into a series of data units by a unit of one sector, but is not limited thereto. That is, upon receiving the starting logical block address, the controller 102 then sequentially receives the series of data units representing the write data #DATA, such as data units $U_0 \sim U_K$ as shown in FIG. 4.

Figure 4:
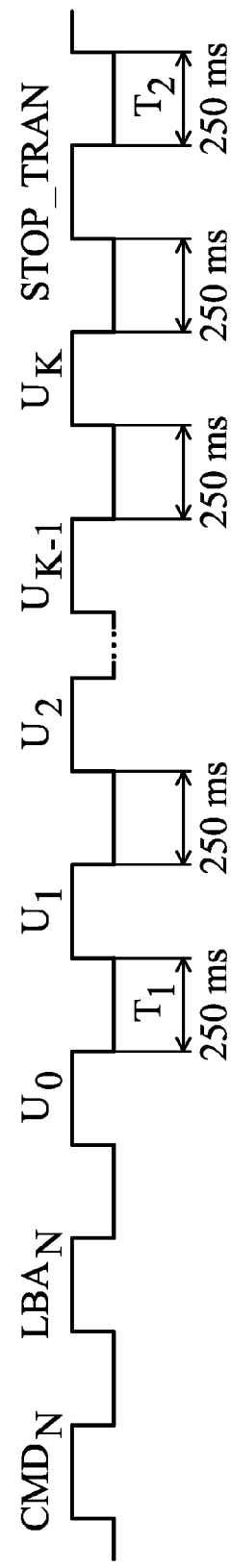
FIG. 4 is a timing diagram illustrating a write command, a corresponding starting logical block address and data units according to an embodiment of the invention.

FIG. 4 is a timing diagram illustrating a write command $CMD_N$, a corresponding starting logical block address $LBA_N$ and data units $U_0 \sim U_K$ according to an embodiment of the invention.

As shown in FIG. 4, after receiving the write command $CMD_N$ and the corresponding starting logical block address $LBA_N$, the controller 102 then receives a series of data units $U_0 \sim U_K$. Further, after receiving the series of data units $U_0 \sim U_K$, the controller 102 then receives a stop transmission command STOP_TRAN, indicating completion of the transmission of the data units $U_0 \sim U_K$. According to an embodiment, the duration between receiving any two successive data units, such as data unit $U_0$ and $U_1$, is referred to as the program busy time, i.e., 250 ms or shorter. In addition, the duration which is initiated upon receiving the stop transmission command STOP_TRAN and terminated when the next command $CMD_{N+1}$ is also 250 ms. Therefore, the controller 102 may divide the integration process for block pairs into at least two steps according to the aforementioned duration. For example, the controller 102 may divide the integration process for block pairs into two steps including a pre-clean operation and a post-clean operation according to the aforementioned duration.

Additionally, the controller 102 determines an update mode according to the target mother block 202 linked to the starting logical block address $LBA_N$ (step S304). According to an embodiment, when the host 12 attempts to update successive pages of the target mother block 202, the update mode of the target mother block 202 is a mother-child mode. According to another embodiment, when the host 12 attempts to update scattered pages of the target mother block 202, the update mode of the target mother block 202 is a file allocation table (FAT) block mode, i.e., a mother-FAT mode.

Figure 5:
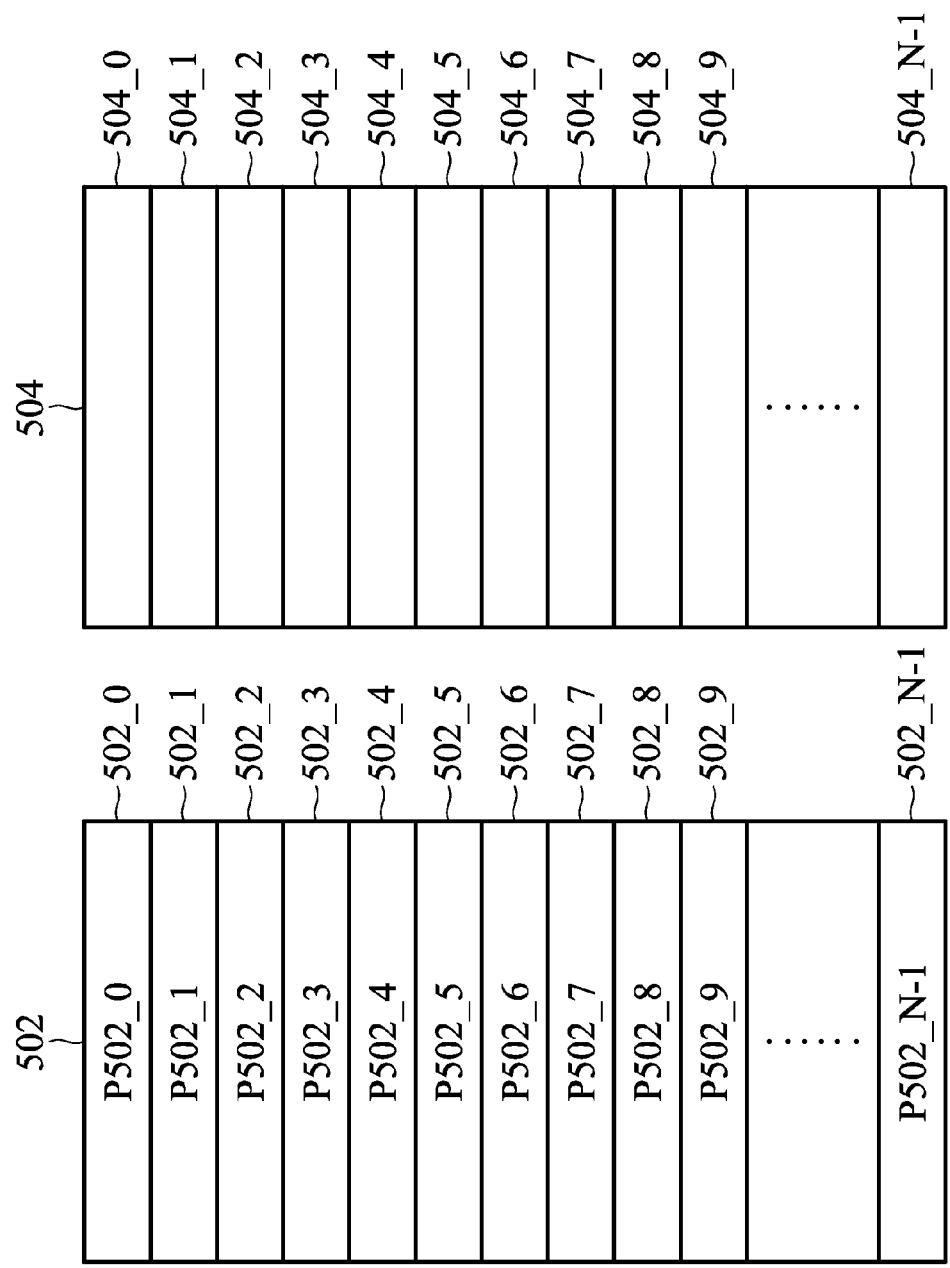
FIG. 5 is a block diagram illustrating a mother block and an update block in a mother-child mode according to another embodiment of the invention.

FIG. 5 is a block diagram illustrating a target mother block 502 and an update block 504 in a mother-child mode according to another embodiment of the invention.

As shown in FIG. 5, the target mother block 502 comprises N pages 502_0~502_N−1, for respectively storing data P502_0~P502_N−1. Correspondingly, the update block 504 also comprises N update pages 504_0~504_N−1. The update block 504 is a spare block and thus no data is stored in the N update pages 504_0~504_N−1.

According to this embodiment, it is assumed that the host 12 makes a request to the controller 102 to update successive pages 502_0~502_4 of the target mother block 502 with data P502_0~P502_4 stored therein. As a result, the controller 102 determines that the update mode of the target mother block 502 is the mother-child mode. That is, the controller 102 configures the update block 504 as a child block to update data in the mother-child mode.

According to the embodiment of FIG. 5, when the controller 102 stores the update data corresponding to the pages 502_0~502_4 of the target mother block 502 to the update pages 504_0~504_4 of the update block 504, the controller 102 further integrates the target mother block 502 with the update block 504. First, the controller 102 configures the target mother block 502 as a block to be cleaned. Next, the controller 102 searches the last update page from the update block 504 corresponding to the target mother block 502, i.e., the update page 504_4. In the pre-clean operation, for the target mother block 502, the controller 102 transfers data P502_5~P502_N−1 stored in pages 502_5~502_N−1 for which no update has been made, to the update pages 504_5~504_N−1 of the update block 504 according to the last update page 504_4. Further, in the post-clean operation, the controller 102 erases the target mother block 502.

Figure 6:
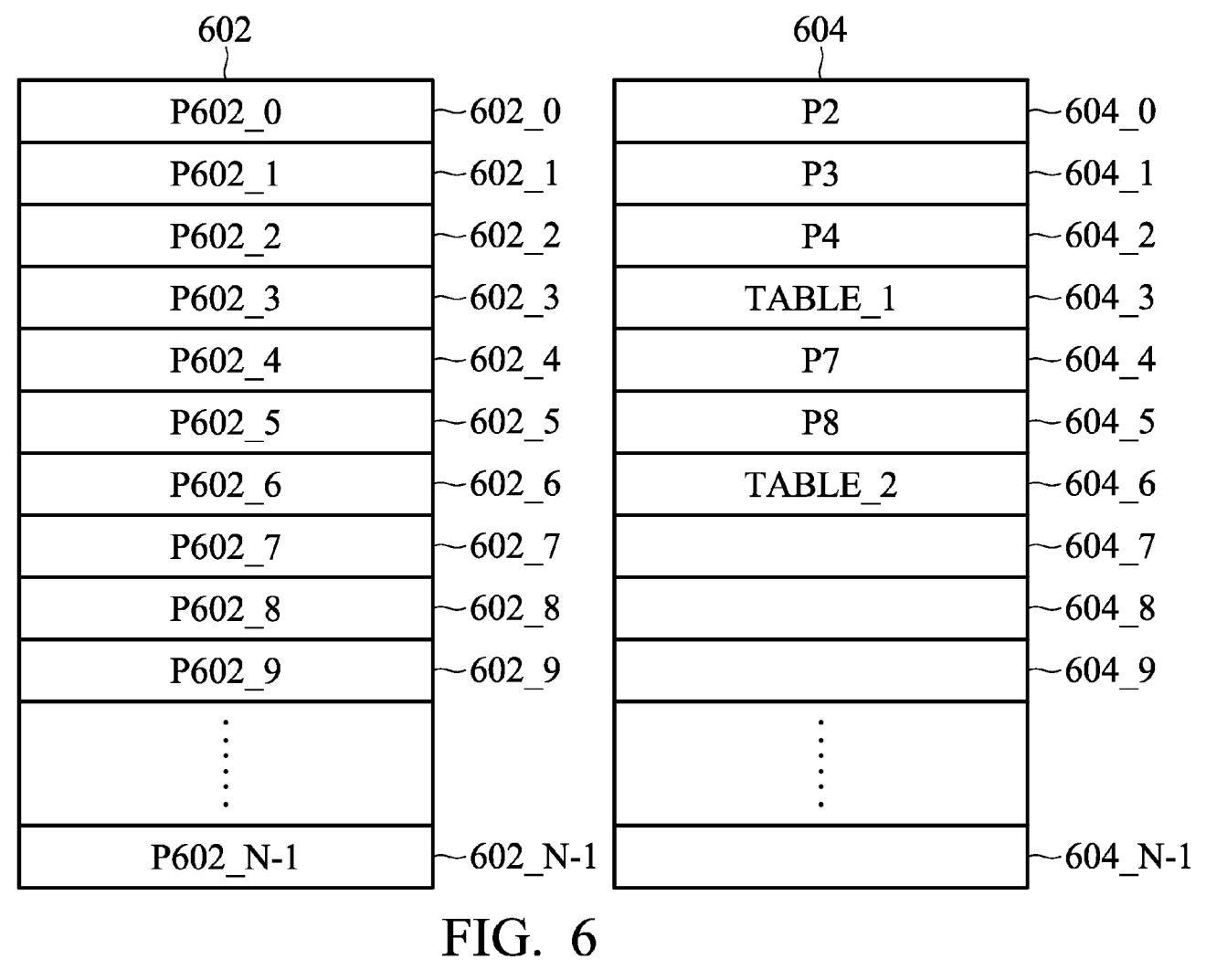

FIG. 6 is a block diagram illustrating a target mother block 602 and an update block 604 in a mother-FAT mode according to another embodiment of the invention.

As shown in FIG. 6, the target mother block 602 comprises N pages 602_0~602_N−1, for respectively storing data P602_0~P602_N−1. Correspondingly, the update block 604 also comprises N update pages 604_0~604_N−1. The update block 604 is a spare block and thus no data is stored in the N update pages 604_0~604_N−1.

According to this embodiment, it is assumed that the host 12 makes a request to the controller 102 to update scattered pages 602_2, 602_3, 602_4, 602_7 and 602_8 of the target mother block 602 with data P602_2, P602_3, P602_4, P602_7 and P602_8 stored therein. Thus, the controller 102 determines that the update mode of the target mother block 602 is the mother-FAT mode. That is, the controller 102 configures the update block 604 as a FAT block to update data in the mother-FAT mode.

For example, when the host 12 attempts to update data of the pages 602_2, 602_3, 602_4, 602_7 and 602_8 of the target mother block 602 by the update data P2, P3, P4, P7 and P8, the controller 102 first stores the update data P2, P3 and P4 into the update pages 604_0, 604_1 and 604_2 of the update block 604. Following, the controller 102 provides a look-up table TABLE_1 for storing the update pages of the update block 604 and corresponding pages of the target mother block 602 required to be updated. That is, the look-up table TABLE_1 stores the mapping relationship between the pages 602_2, 602_3 and 602_4 of the target mother block 602 and the update pages 604_0, 604_1 and 604_2 of the update block 604. Next, the controller 102 programs the look-up table TABLE_1 into the update page 604_3 of the update block 604. Further, the controller 102 stores the update data P7 and P8 into the update pages 604_4 and 604_5 of the update block 604. Similarly, the controller again provides a look-up table TABLE_2 for storing the mapping relationship between the pages 602_7 and 602_8 of the target mother block 602 and the update pages 604_4 and 604_5 of the update block 604. Then, the controller 102 programs the look-up table TABLE_2 into the update page 604_6 of the update block 604 to complete the data updating operation in the mother-FAT mode.

According to the embodiment of FIG. 6, when the update block 604 which stores data for updating the target mother blocks 602 is full, the controller 102 is required to integrate the target mother block 602 with the update block 604. The controller 102 first configures the target mother block 602 as a block to be cleaned. Next, the controller 102 selects a spare block from the spare pool 108, such as block $S_j$. Thus, in the pre-clean operation, the controller 102 integrates the data stored in the target mother block 602 and the update data stored in the update pages of the update block 604 according to the look-up table TABLE_1 and TABLE_2, so as to obtain an integrated write data. In detail, the controller 102 obtains the integrated write data by integrating data stored in pages for which no update has been made, such as 602_0, 602_1, 602_5, 602_6 and 602_9~602_N−1, of the target mother block 602, and the data stored in the update pages 604_0~604_2 and 604_4~604_5 of the update block 604. Afterwards, in the post-operation, the controller 102 erases the target mother block 602 and the update block 604.

Furthermore, referring to FIGS. 3 and 4, when the update mode of the target mother block is determined, the controller 102 obtains the write data #DATA for updating from the host 12, i.e., data units $U_0$~$U_K$. Specifically, upon receiving the first data unit $U_0$ (step S306 in FIG. 3), the controller 102 determines whether an integration process is unfinished during the execution of the previous command $CMD_{N-1}$. That is, the controller 102 determines whether a pre-clean operation has been performed to a specific mother block configured as the block to be cleaned (step S308 in FIG. 3).

When a pre-clean operation has been performed on the specific mother block, the controller 102 performs the post-clean operation on the specific mother block during the first time period T1 of 250 ms (step S310 in FIG. 3).

When no pre-clean operation has been performed on the specific mother block during the execution of the previous command $CMD_{N-1}$, the controller 102 first performs the pre-clean operation on the specific mother block during the first time period T1. Next, the controller 102 may perform the post-clean operation on the specific mother block during another time period, such as the time period between data units $U_1$ and $U_2$ (step S312 in FIG. 3).

Further, the specific mother block is erased and the controller 102 re-configures the specific mother block as a spare block (step S314 in FIG. 3).

Next, the controller 102 proceeds to receive the remaining data units to perform data updating in the mother-child mode as shown in FIG. 5 or data updating in the mother-FAT mode as shown in FIG. 6. Specifically, the controller 102 performs a programming process to write data, i.e., #DATA, corresponding to the write command $CMD_N$ and the starting logical block address $LBA_N$ (step S316 in FIG. 3). That is, the controller 102 sequentially programs all of the data units $U_0 \sim U_K$ into the corresponding update pages of the update block 504 or 604 according to the update mode of the target mother block 502 or 602.

Upon receiving the stop transmission command STOP_TRAN, the controller 102 then determines whether the number of block pairs exceeds a predetermined value (step S318 in FIG. 3).

The normal operation of the memory device 10 may be affected when the number of block pairs has reached the predetermined value. In this case, the controller 102 first selects a block pair from the current block pairs to perform the integration process. Next, during the duration which is initiated upon receiving the stop transmission command STOP_TRAN and terminated when the next command $CMD_{N+1}$ is received, i.e., during the second time period T2 of 250 ms as shown in FIG. 4, the controller 102 performs a partial integration process, i.e., the aforementioned pre-clean operation, on the selected block pair (step S320 in FIG. 3). Following, the controller 102 may perform a remaining integration process, i.e. the aforementioned post-clean operation, on the selected block pair during the execution of the next command $CMD_{N-1}$, such as during the duration of 250 ms after receiving the first data unit of the next command $CMD_{N+1}$. As such, the problem of write timeout may be effectively eliminated.

When the number of block pairs is below the predetermined value, the controller 102 further determines whether the update mode of the target mother block is the mother-FAT mode (step S322 in FIG. 3).

Referring to FIGS. 3, 4 and 6, when the update mode of the target mother block 602 is determined as the mother-FAT mode, the controller 102 obtains the data length of the write data #DATA to update the target mother block 602, i.e., the data length of the data units $U_0 \sim U_K$. Next, after the process of programming write data, i.e., #DATA, is performed, the controller 102 calculates a final logical block address of the update block 604 corresponding to the target mother block 602, such as the update page 604_6 as shown in FIG. 6, according to the starting logical block address $LBA_N$ and the data length. Then, the controller 102 obtains the number of available pages of the update block 604 according to the final logical block address and the size of the update block 604. Specifically, according to the embodiment of FIG. 6, the update block 604 comprises N update pages and the final logical block address is the update page 604_6. In this case, the number of the available pages of the update block 604 is equal to (N−7). Further, the controller 102 determines whether the number of the available pages of the update block 604, i.e., (N−7), is below a predetermined threshold (step S324 in FIG. 3).

When the number of the available pages of the update block 604, i.e., (N−7), exceeds the predetermined threshold, it indicates that the number of the available pages of the update block 604, i.e., (N−7), is sufficient for following data updating operations. That is, it is unnecessary to integrate the target mother block 602 and the update block 604.

Otherwise, when the number of the available pages of the update block 604, i.e., (N−7), is below the predetermined threshold, it is necessary for the controller 102 to further integrate the target mother block 602 and the update block 604. Specifically, the controller 102 first configures the target mother block 602 as a block to be cleaned. Next, during the second time period T2 as shown in FIG. 4, the controller 102 performs the pre-clean operation on the target mother block 602 and the update block 604 (step S326 in FIG. 3). Moreover, during the execution of the next command $CMD_{N+1}$, such as during the duration of 250 ms after receiving the first data unit of the next command $CMD_{N+1}$, the controller 102 performs the post-clean operation on the target mother block 602 and the update block 604. A detailed description of the pre-clean and post-clean operation associated with the target mother block 602 and the update block 604 is illustrated in the aforementioned embodiments with reference to FIG. 6, and hence, further descriptions thereof will be omitted.

From the aforementioned description of embodiments of the invention, it is shown that a block pair with a target mother block and an update block may be provided for data updating, so as to prevent write timeout of a memory device. Further, the integration process of the block pair may be divided into at least 2 steps. That is, the integration process of the block pair may be divided into a pre-clean operation and a post-clean operation when the controller receives the write data from the host, or during the duration which is initiated upon receiving the stop transmission command STOP_TRAN and terminated when the next command is received. Therefore, during the execution of each command, the controller may integrate one or more block pairs at the same time to save on the amount of time consumed for integrating block pairs and prevent the problem of write timeout; thereby improving overall access performance of the memory devices.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A write timeout control method for a flash memory, wherein the flash memory comprises a plurality of data blocks and a plurality of spare blocks, the data blocks comprise a plurality of mother blocks, and the write timeout control method comprises the steps of:
    receiving a write command and a corresponding starting logical block address from a host;
    determining an update mode according to a target mother block which is linked to the starting logical block address;
    determining whether a pre-clean operation is performed on a first mother block, wherein the first mother block is configured as a block to be cleaned;
    performing a post-clean operation on the first mother block during a first time period when the pre-clean operation is performed on the first mother block;
    re-configuring the first mother block as a spare block;
    performing a programming process to write data on the target mother block which is linked to the starting logical block address according to the update mode, wherein the process corresponds to the write command;
    determining whether the number of the mother blocks exceeds a first threshold; and performing the pre-clean operation on a second mother block during a second time period when the number of the mother blocks exceeds the first threshold, wherein the second mother block is configured as the block to be cleaned.

2. The write timeout control method as claimed in claim 1, wherein after the step of receiving the starting logical block address, the write timeout control method further comprises the step of:
sequentially receiving a series of data units representing the write data.

3. The write timeout control method as claimed in claim 2, wherein after the step of receiving the series of data units, the write timeout control method further comprises the step of:
receiving a stop transmission command from the host, indicating completion of the transmission of the write data corresponding to the write command.

4. The write timeout control method as claimed in claim 3, wherein the first time period indicates the duration which is initiated upon receiving a first data unit and terminated when a second data unit is received.

5. The write timeout control method as claimed in claim 4, wherein the second time period indicates the duration which is initiated upon receiving the stop transmission command and terminated when a next command from the host is received.

6. The write timeout control method as claimed in claim 5, further comprising the steps of:
performing the pre-clean operation on the first mother block during the first time period when the per-clean operation has not been performed on the first mother block; and
performing the post-clean operation on the first mother block during a third time period,
wherein the third time period after the first time period and before the second time period indicates the duration between receiving any two successive data units.

7. The write timeout control method as claimed in claim 1, wherein the data blocks further comprise a plurality of update blocks and each update block comprises one or more update pages for updating a corresponding mother block.

8. The write timeout control method as claimed in claim 7, wherein the pre-clean operation and the post-clean operation comprise the steps of:
obtaining the update mode of the block to be cleaned;
searching the last update page from an update block corresponding to the block to be cleaned when the update mode of the block to be cleaned is a mother-child mode;
transferring data stored after the location of the last update page of the block to be cleaned to the update block according to the last update page; and
erasing the block to be cleaned.

9. The write timeout control method as claimed in claim 7, wherein the pre-clean operation and the post-clean operation comprise the steps of:
obtaining the update mode of the block to be cleaned;
obtaining a predetermined spare block when the update mode of the block to be cleaned is a mother-FAT mode;
providing a look-up table associated with the block to be cleaned and a corresponding update block, wherein the look-up table stores the one or more update pages and corresponding pages of the block to be cleaned;
obtaining an integrated write data by integrating data stored in the block to be cleaned and data stored in the one or more update pages according to the look-up table;
programming the integrated write data into the predetermined spare block; and
erasing the block to be cleaned and the corresponding update block.

10. The write timeout control method as claimed in claim 7, further comprising the steps of:
determining whether the update mode of the target mother block is a mother-FAT mode when the number of the mother blocks is below the first threshold;
obtaining a data length of the write data when the update mode of the target mother block is the mother-FAT mode;
calculating a final logical block address of an update block which corresponds to the target mother block according to the starting logical block address and the data length after performing the programming process to write data;
obtaining the number of available pages of the update block according to the final logical block address and the size of the update block;
determining whether the number of the available pages is below a second threshold;
configuring the target mother block as the block to be cleaned when the number of the available pages is below the second threshold; and
performing the pre-clean operation on the target mother block during the second time period.

11. A memory device coupled to a host, comprising:
a flash memory comprising a plurality of data blocks and a plurality of spare blocks, wherein the data blocks comprise a plurality of mother blocks; and
a controller coupled to the flash memory for receiving a write command and a corresponding starting logical block address from the host, determining an update mode according to a target mother block which is linked to the starting logical block address, determining whether a pre-clean operation is performed on a first mother block which is configured as a block to be cleaned, performing a post-clean operation on the first mother block during a first time period when the pre-clean operation is performed on the first mother block, re-configuring the first mother block as a spare block, performing a programming process to write data corresponding to the write command on the target mother block which is linked to the starting logical block address according to the update mode, determining whether the number of the mother blocks exceeds a first threshold, and performing the pre-clean operation on a second mother block which is configured as the block to be cleaned during a second time period when the number of the mother blocks exceeds the first threshold.

12. The memory device as claimed in claim 11, wherein the controller sequentially receives a series of data units representing the write data after receiving the starting logical block address.

13. The memory device as claimed in claim 12, wherein the controller receives a stop transmission command from the host, indicating that the transmission of the write data corresponding to the write command is finished after receiving the series of data units.

14. The memory device as claimed in claim 13, wherein the first time period indicates the duration which is initiated upon receiving a first data unit and terminated when a second data unit is received.

15. The memory device as claimed in claim 14, wherein the second time period indicates the duration which is initiated upon receiving the stop transmission command and terminated when a next command from the host is received.

16. The memory device as claimed in claim 15, wherein the controller performs the pre-clean operation on the first mother block during the first time period when the per-clean operation has not been performed on the first mother block and performs the post-clean operation on the first mother block during a third time period, and wherein the third time period after the first time period and before the second time period indicates the duration between receiving any two successive data units.

17. The memory device as claimed in claim 11, wherein the data blocks further comprise a plurality of update blocks and each update block comprises one or more update pages for updating a corresponding mother block.

18. The memory device as claimed in claim 11, wherein the controller obtains the update mode of the block to be cleaned, searches the last update page from an update block corresponding to the block to be cleaned when the update mode of the block to be cleaned is a mother-child mode, transfers data stored after the location of the last update page of the block to be cleaned to the update block according to the last update page, and erases the block to be cleaned for performing the pre-clean operation and the post-clean operation.

19. The memory device as claimed in claim 11, wherein the controller obtains the update mode of the block to be cleaned, obtains a predetermined spare block when the update mode of the block to be cleaned is a mother-FAT mode, provides a look-up table associated with the block to be cleaned and a corresponding update block for storing the one or more update pages and corresponding pages of the block to be cleaned, obtains an integrated write data by integrating data stored in the block to be cleaned and data stored in the one or more update pages according to the look-up table, programs the integrated write data into the predetermined spare block and erases the block to be cleaned and the corresponding update block for performing the pre-clean operation and the post-clean operation.

20. The memory device as claimed in claim 11, wherein the controller determines whether the update mode of the target mother block is a mother-FAT mode when the number of the mother block is below the first threshold, obtains a data length of the write data when the update mode of the target mother block is the mother-FAT mode, calculates a final logical block address of an update block corresponding to the target mother block according to the starting logical block address and the data length after performing the programming process to write data, obtains the number of available pages of the update block according to the final logical block address and the size of the update block, determines whether the number of the available pages is below a second threshold, configures the target mother block as the block to be cleaned when the number of the available pages is below the second threshold, and performs the pre-clean operation on the target mother block during the second time period.

* * * * *